United States Patent
Jeppesen

(10) Patent No.: US 9,600,758 B2
(45) Date of Patent: Mar. 21, 2017

(54) RADIO FREQUENCY IDENTIFICATION TAG

(75) Inventor: Henrik Risbo Jeppesen, Farum (DK)

(73) Assignee: BR-TECHNIC, Farum (DK)

( * ) Notice: Subject to any disclaimer, the term of this patent is extended or adjusted under 35 U.S.C. 154(b) by 1438 days.

(21) Appl. No.: 13/129,174

(22) PCT Filed: Aug. 20, 2009

(86) PCT No.: PCT/DK2009/050205
§ 371 (c)(1),
(2), (4) Date: May 13, 2011

(87) PCT Pub. No.: WO2010/063287
PCT Pub. Date: Jun. 10, 2010

(65) Prior Publication Data
US 2011/0248830 A1    Oct. 13, 2011

(30) Foreign Application Priority Data

Dec. 6, 2008  (DK) .................................. 2008 01738
Jan. 12, 2009  (DK) .................................. 2009 00042

(51) Int. Cl.
*H04Q 5/22*  (2006.01)
*G06K 19/077*  (2006.01)
*A01K 11/00*  (2006.01)

(52) U.S. Cl.
CPC ...... *G06K 19/07749* (2013.01); *A01K 11/004* (2013.01); *A01K 11/006* (2013.01)

(58) Field of Classification Search
CPC ............ G06K 19/07749; A01K 11/004; A01K 11/006

(Continued)

(56) References Cited

U.S. PATENT DOCUMENTS 5,016,368 A * 5/1991 Cassata ..................... G09F 3/12
                                                        24/108
5,711,246 A * 1/1998 Yano ..................... A01K 11/006
                                                        119/51.02

(Continued)

FOREIGN PATENT DOCUMENTS

EP    0 941 656 A1    9/1999
EP    1 598 815 A1    11/2005

(Continued)

*Primary Examiner* — Naomi Small
(74) *Attorney, Agent, or Firm* — Nath, Goldberg & Meyer; Jerald L. Meyer

(57) ABSTRACT

A radio frequency identification RFID device comprising:
  a wireless communication device, such as an RFID chip or strap, having at least a pair of contact points, and
  an antenna structure having a sheet of electrically conductive material being provided with an inner opening so as to provide a hole through the antenna structure, the sheet further being provided with an elongated slot with a first and a second side, the slot having an inner end at a periphery of the opening and an outer end at a periphery of the sheet, the slot being formed so as to provide a spacing between the first side and the second side, wherein
  the conductive material is electrically connected from the first side of the slot to the second side of the slot via contact points and through the communication device at a position between the inner end and the outer end.

12 Claims, 2 Drawing Sheets

Figure 1:
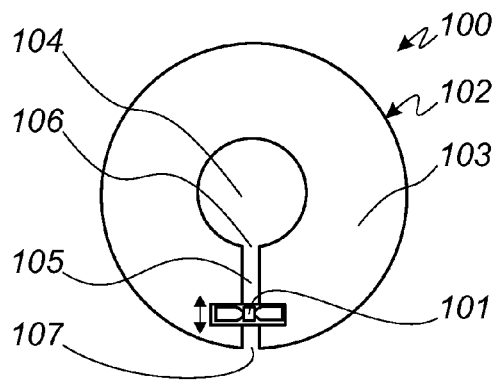

(58) Field of Classification Search
USPC .......................................................... 340/10.1
See application file for complete search history.

(56) References Cited

U.S. PATENT DOCUMENTS

| | | | | |
|---|---|---|---|---|
| 6,411,213 B1* | 6/2002 | Vega | .................... | G06K 7/0008 |
| | | | | 119/720 |
| 6,501,430 B1* | 12/2002 | Esselink | ............... | A01K 11/004 |
| | | | | 340/572.1 |
| 7,292,148 B2* | 11/2007 | Forster | ................. | G06K 7/0095 |
| | | | | 156/264 |
| 7,298,343 B2 | 11/2007 | Forster et al. | | |
| 7,701,352 B2* | 4/2010 | Forster | ............. | G06K 19/07749 |
| | | | | 340/572.7 |
| 7,726,055 B2* | 6/2010 | Costantini | ............ | A01K 11/004 |
| | | | | 24/704.1 |
| 2003/0117284 A1* | 6/2003 | Thomas | ............... | A01K 11/004 |
| | | | | 340/573.3 |
| 2005/0024287 A1* | 2/2005 | Jo | ...................... | G06K 19/0726 |
| | | | | 343/822 |
| 2005/0093677 A1* | 5/2005 | Forster | ............ | G06K 19/07749 |
| | | | | 340/10.1 |
| 2006/0043198 A1* | 3/2006 | Forster | ............ | G06K 19/07749 |
| | | | | 235/492 |
| 2006/0202835 A1* | 9/2006 | Thibault | ............... | A01K 11/004 |
| | | | | 340/573.1 |
| 2006/0244603 A1* | 11/2006 | Kline | ............... | G06K 19/07718 |
| | | | | 340/572.7 |
| 2008/0012709 A1* | 1/2008 | Stobbe | ................... | G06K 19/04 |
| | | | | 340/572.1 |
| 2008/0250682 A1* | 10/2008 | Costantini | ............ | A01K 11/001 |
| | | | | 40/301 |
| 2008/0258875 A1* | 10/2008 | Jesme | ............. | G06K 19/07749 |
| | | | | 340/10.1 |

FOREIGN PATENT DOCUMENTS

| | | |
|---|---|---|
| WO | 01/37215 A1 | 5/2001 |
| WO | 2006/031087 A1 | 3/2006 |
| WO | 2006/080615 A1 | 8/2006 |

* cited by examiner

RADIO FREQUENCY IDENTIFICATION TAG

This is a National Phase Application filed under 35 U.S.C. 371 as a national stage of PCT/DK2009/050205, filed Aug. 20, 2009, an application claiming the benefit from Danish Application No. PA 2008 01738, filed Dec. 6, 2008 and No. PA 2009 00042, filed Jan. 12, 2009, the content of each of which is hereby incorporated by reference in its entirety.

TECHNICAL FIELD

The present invention relates to a radio frequency identification RFID device comprising: a wireless communication device, such as an RFID chip or strap, having at least a pair of contact points, and an antenna structure having a sheet of electrically conductive material.

BACKGROUND

RFID devices, commonly referred to as RFID tags, are well known in the art for a variety of applications. When enquired by a reader emitting radio frequency waves, the RFID tag responds typically with a unique identifier. Commonly, such tags comprise a wireless communication device in form of an RFID chip and an antenna circuit. While RFID chips are being miniaturised by improvement in semiconductor fabrication, smaller antenna circuits are difficult to achieve due to their small size relative to the wavelength of radio signal to be received from the reader. A distinction is made between active and passive tags, depending on whether the tag comprises a power source, or is powered by the received radio signal.

RFD devices exist for both the low frequency (LF), high frequency (HF), and the ultra high frequency (UHF) bands. Due to the lower frequencies in the LF and HF range, such devices typically require larger antenna circuits than UHF range devices. A number of different antenna designs seek to overcome different design challenges, however often thus targeting the antenna for specific applications. For instance, reading distance, i.e. the distance between a reading unit and the tag, may often be sacrificed in order to obtain a small antenna.

Typically, existing marking tags for animals including RFID devices operate in the LF or HF range. Typically, they are operated in a near field range, where the magnetic field from a reader is significant. In a far field, the electric field from the reader will dominate, and the magnetic field be vanishing. Typically, such tags require antennas in form of a wire spool, e.g. with a diameter around 10 cm. However, for animal marking tags, smaller diameter spools are used, resulting in a short maximum reading distance. Commonly, such wire spools are made of copper, which is of environmental concern. Also, should the wire be broken at any paint of such a spool, e.g. by an animal bite, the antenna will no longer function. Additionally, LF devices must commonly be interrogated individually, otherwise collision will occur.

Typically, REID devices operating in the HF range comprise a planar antenna spool. Such devices may e.g. be found in library books and in passports. However, such devices may not typically be interrogated from a side, i.e. In the plane of the antenna. Thus, a specific orientation of the tag is needed to ensure good reader performance. Like in the case for an LF device, a HF device would easily be destroyed in the event of even a minor damage to the antenna circuit.

Electronic marking devices are known in the art. For example, US 2005/093677 discloses an RFID device for marking purposes with improved reading distance. The RFID device may be configured for operation in the UHF range of radio frequencies. The RFID device comprises an antenna structure that is made from a thin sheet material, and that has an elongated slot that facilitates increased readability of the RFID device. An RFID interposer is connected across peripheral ends of the elongated slot. However, the RFID device of US 2005/093677 is difficult to secure to an item in a rugged environment, such as encountered when marking animals. Furthermore, the RFID device of US 2005/093677 does not provide a simple means for tuning the device to different electromagnetic environments as typically encountered when dealing with different applications.

Further, WO 01/37215 A discloses a mobile data carrier for the electronic marking of items, wherein the mobile data carrier comprises a transponder made from a surface wave component with a slot antenna. The surface wave element is placed on the slot and connected to either side of the slot by means of respective electrical contacts, wherein the input impedance of the surface wave element determines the position of the surface wave element on the slot. However, the data carrier of WO 01/37215 A does not provide a simple means for tuning the device to different electromagnetic environments as typically encountered when dealing with different applications. Adaption of the mobile data carrier of WO 01/37215 A either requires a new antenna structure, where the length of the antenna slot is cut specifically for each different application, or requires a bulky construction with a back plate mounted with distance elements, in order to make the data carrier less sensitive to an application specific electromagnetic environment.

EP 0 941 656 A discloses a device for marking/identifying animals, the device comprising a carrier provided with an electronic transponder consisting of at least one electronic component and one antenna winding.

DISCLOSURE OF THE INVENTION

It is an object of the present invention to obtain a new radio frequency identification device, a new marking device, and a new method of fabrication, which overcome or ameliorates at least one of the disadvantages of the prior art or which provide a useful alternative.

According to the invention, the object is achieved by radio frequency identification RFID device comprising a wireless communication device, such as an RFID chip or strap, having at least a pair of contact points, and an antenna structure having a sheet of electrically conductive material being provided with an inner opening so as to provide a hole through the antenna structure, the inner opening being configured to facilitate a locking mechanism engaging with the tag through the opening, the sheet further being provided with an elongated slot with a first and a second side, the slot having an inner and at a periphery of the opening and an outer end at a periphery of the sheet, the slot being formed so as to provide a spacing between the first side and the second side, wherein the conductive material is electrically connected from the first side of the slot to the second side of the slot via the contact points and through the communication device at a position between the inner end and the outer end, the position being determined so as to tune the RFID device to a pre-determined resonance frequency. In this way, an RFID device or tag is achieved, which is particularly convenient since the opening facilitates efficient attachment of the tag to an item to be marked. This may result in a secure attachment, e.g. resistant to tampering and/or accidental detachment. Combined with the small dimensions of the proposed antenna design, a compact and light weight tag may thus be achieved.

In a particular embodiment of the invention, the antenna structure is adapted for being operated in a far-field range, meaning that enquiry of the wireless communication device may take place within an extended range, such as at least 0.5 m, or 1.0 m, or even 2.0 m.

In another particular embodiment, the antenna structure is adapted to provide an omnidirectional radiation pattern. This is advantageous for convenient reading from the RFID device, as no particular orientation of the tag is needed.

In another embodiment, the sheet of the antenna structure is being at least partly comprised on a carrying layer for providing a mechanical strength to the antenna structure.

In another embodiment of the invention, the antenna structure is adapted for receiving and transmitting radio frequency waves having frequencies within the Ultra High Frequency UHF range, i.e. in the range 800 MHz-1100 MHz. The operating frequency depends on the local restrictions. For example, operation at 865 MHz is permitted within the European Union. RFID devices for the UHF range are particularly suitable for applications where a small tag with a long reading distance is advantageous, compared to known LF or HF range devices due to the shorter wavelength of the electromagnetic waves.

In another embodiment of the invention, the antenna structure has an outer width, such as a diameter, in the range of 10-65 mm, 12-40 mm, 15-35 mm, or even 20-30 mm. Such dimensions have been found to be suitable for operation in the UHF range.

In another embodiment of the invention, the opening of the RFID device has a diameter in the range of 5-30 mm, or 10-20 mm, or even 12-16 mm.

In another embodiment of the invention, the opening of the RFD device has a circular shape.

In another embodiment of the invention, the conductive sheet of the antenna structure has a thickness which is less than 10%, or less than 7%, or less than 5%, or even less than 1% of a maximum outer dimension, such as a diameter, of the conductive sheet. This embodiment ensures a particularly light-weight tag, while ensuring suitable radio frequency performance, e.g. with regard to reading distance, etc.

In another embodiment of the invention, the electrically conductive sheet of the antenna structure comprises a substantially circular outer periphery. In this way, a substantially circular symmetric in-plane transmission characteristic is achieved.

In another embodiment of the invention, the opening is substantially circular and has a diameter in the range of 30%-90%, or 40-80%, or even 50%-70% of a diameter of the conductive sheet of the antenna structure. An opening of this size maintains good radio frequency performance while providing a suitable opening for improving the mechanical stability if, for instance, the tag is laminated between two additional layers. In this case, the lamination material may come in contact through the hole, thus providing a strong adhesion in this area. This helps to lift limitations on material compatibility as otherwise known in the art.

In another embodiment of the invention, the opening may facilitate e.g. a locking mechanism engaging with the tag through the opening. This enables a strong attachment of the tag to an object, such as e.g. a textile item, or an ear of a farm animal. Since the attachment is substantially central to the tag, and close to the antenna structures, the tag may not easily be removed.

In another embodiment of the invention, the opening is substantially circular and has a diameter in the range of 5-30 mm, or 10-20 mm, or even 12-16 mm. Such diameters have been shown to be advantageous for obtaining a tag with a resonance frequency in the UHF range, e.g. around 866 MHz as required within the European Union.

In another embodiment of the invention, the slot is substantially straight. In general, the electronic parameters, such as the impedance of the antenna and the resonance frequency of the antenna may be tuned elegantly by changing the position of the wireless communication device along the slot. By providing a straight slot, a particularly efficient antenna structure is achieved, since the maximum tuning range is thus achieved. For a manufacturer, this is valuable, since the electronic parameters generally change depending on e.g. which materials are directly surrounding the RFID device, such as the packaging of the tag. Thus, by enabling the device to be tuned at assembly time, different configurations of the tag may be accommodated by a single antenna design and a single wireless communication device.

In another embodiment of the invention, the RFID device further comprises at least a first and a second protection layer, wherein the first and the second protection layers, respectively, are on a first and a second side of an assembly comprising the wireless communication device, and the antenna structure, the first and second protection layers covering at least substantial parts of the assembly, wherein the first and second protection layers are in mutual contact through the opening in the antenna structure, and are in mutual contact along at least part of an outer edge of the antenna structure. According to an embodiment of the invention, both the first and the second protection layer are provided by casting in the RFID device in a suitable polymer. It has been shown that the proposed RFID device is robust with regard to vibrations, twist, high temperatures, and even to perforations of the conductive sheet of the antenna, as long as such perforations do not break the electrical connection through the antenna.

In another embodiment of the invention, the antenna structure comprises one or more additional openings for providing additional holes through the antenna structure.

According to the invention, the object is also achieved by a marking tag for animals, such as an ear tag, comprising a radio frequency identification device according to one of the above-mentioned embodiments, wherein the marking tag further comprises an attachment member for piercing a part of the animal, such as an ear, the attachment member comprising engagement means, and wherein the opening of the marking tag comprises locking means, which locking means are adapted for being lockingly engaged with the engagement means of the attachment means. In this way, a particularly light and small RFID enabled marking tag is achieved. The small dimensions of the marking tag make the tag less irritating for the animal to wear, which is important since the animal is generally to wear the marking tag substantially throughout the animals lifespan. Additionally, the central locking of the attachment member to the marking tag minimises the amount of play between the tag and the animal, in which a foreign object could otherwise be caught. An additional advantage of the inventive marking tag over others known in the art is that the use of heavy and environmentally unfriendly copper spool antennas is avoided.

Finally, according to the invention, the object is achieved by a method for manufacturing of a radio frequency identification device, comprising the steps of:

a) providing a wireless communication device with two contact points, b) providing a carrying layer for an antenna structure, c) applying a conductive layer to the carrying layer in a basin geometry, the basic geometry having an elongated slot, the slot having an outer end at the periphery of the conductive layer, d) providing a substantially central opening through the carrying layer and the conductive layer, wherein the opening is configured to facilitate a locking mechanism engaging with the tag through the opening, and wherein the opening and the slot are arranged such that the slot has an inner end at the periphery of the opening, e) tuning the resonance frequency of the device by changing a position of the wireless communication device along the slot of the antenna structure, and f) fixating the wireless communication device permanently to the antenna structure in the position found by tuning. In this way, fabrication of the antenna structure and of the wireless communication device may be separated. This is advantageous since identical antennas must often be ordered from a supplier in large quantities, making it desirable to use identical antennas in a multitude of applications. Thus a supplier may carry out steps b) and c), while the remaining steps may be tailored to the specific application.

In an alternative embodiment of the invention, the basic geometry is achieved in an additional step, following c) by cutting the carrying layer and the conductive layer to the desired geometry. Optionally, this additional step may be combined with step d).

BRIEF DESCRIPTION OF THE DRAWING(S)

Figure 2:
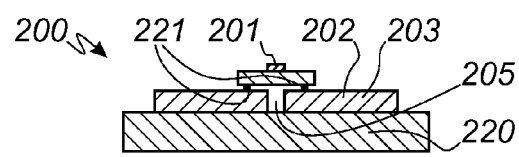
Figure 3:
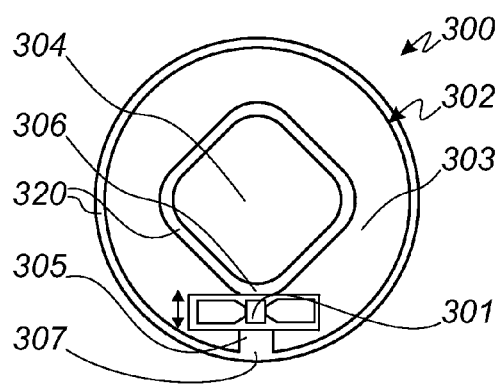
Figure 4:
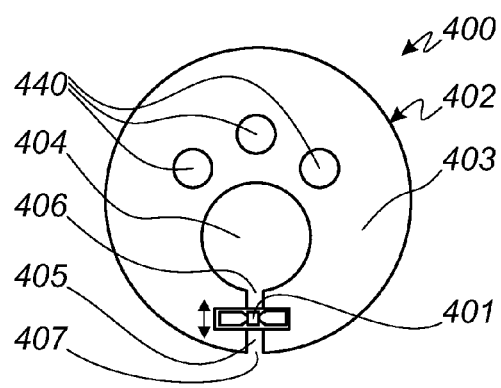
Figures 5A, 5B:
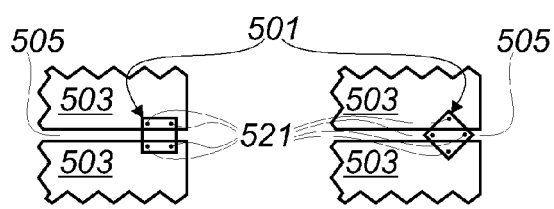
Figures 5C, 5D:
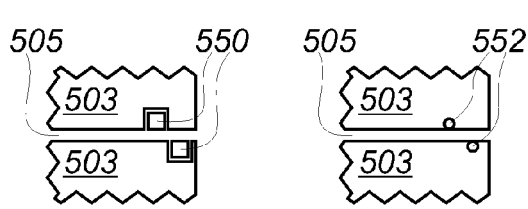
Figure 6:
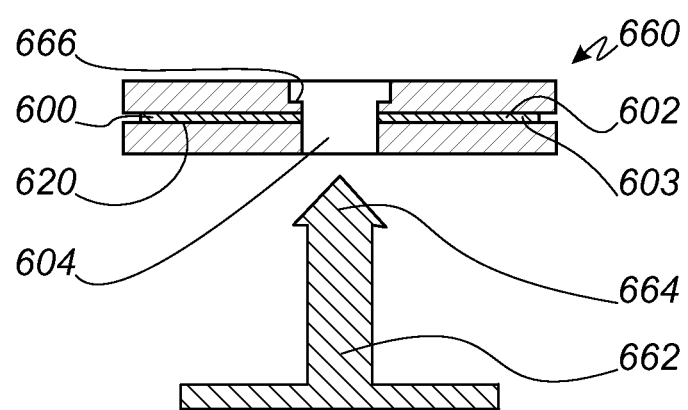

The invention is explained in detail below with reference to the drawings, in which FIG. 1 is a top view of a radio frequency identification (RFID) device according to an embodiment of the invention, FIG. 2 is a cross-sectional side view of another embodiment of an RFID device according to the invention, FIG. 3 is a top view of a third embodiment of the invention, FIG. 4 is a fourth embodiment of the invention, FIG. 5 shows various mounting options of the wireless communication device, and FIG. 6 is a cross-sectional side view of a marking tag according to another aspect of the invention.

DETAILED DESCRIPTION OF THE INVENTION

Illustrated in FIG. 1 is a radio frequency identification (RFID) device 100, seen in a top view. The RFID device 100 comprises a wireless communication device 101 and an antenna structure 102 together forming an RFID circuit. The antenna structure 102 comprises a conductive sheet 103, which is arranged to provide an inner opening 104 and a slot 105. By changing the position of the wireless communication device 101 along the length of the slot 105 between an inner end 106 and an outer end 107, a resonance frequency and/or an impedance of the RFID circuit may be tuned. The wireless communication device 101 may then be permanently bonded to the antenna structure 102 by an adhesive, soldering, thermal bonding or any other suitable method.

According to an example, an RFID device 100 as shown in FIG. 1 was made having a circular outer shape with a diameter of 28 mm and a circular inner opening 104 with a diameter of 13 mm. The device 100 was shown to have a resonance frequency slightly higher than the 865 MHz permitted in the European Union when operated in free air. Then the device was cast in a bitumen membrane in a standard process under a temperature of approximately 200° C. Despite the harsh treatment, the RFID device was still functioning, owing to the rugged design. Commonly, this casting process is used for producing bitumen roofing membranes for buildings. As such, the RFID device 100 according to the invention may readily be implemented in conventional roofing membrane production, as well as in a variety of other products made in similar procedures.

FIG. 2 shows a cross section of another embodiment of an RFD device 200 according to the invention. This embodiment corresponds to the embodiment shown in FIG. 1 where like reference numerals refer to like parts. Therefore, only the differences between the two embodiments are described here. In this embodiment, the conductive sheet 203 of the antenna structure 202 is comprised on a carrying layer 220. This carrying layer may comprise e.g. a polyolefin foil, a polyester foil, or a paper layer. The wireless communication device 201 is seen to be coupled to the conductive sheet 203 via the contact points 221. This coupling may be either a conductive or a capacitive coupling.

FIG. 3 shows a third embodiment corresponding to the embodiments in FIGS. 1 and 2, where like reference numerals refer to like parts. In the present embodiment, the conductive sheet 303 of the antenna structure 302 is provided on a carrying layer 320. As seen in the figure, the carrying layer 320 may be trimmed to the outer dimensions of the conductive sheet 303. Also, the carrying layer 320 may be trimmed corresponding to the inner opening 304 to provide a hole through the whole antenna structure 302.

FIG. 4 shows a fourth embodiment, corresponding to the previous embodiments, where like reference numerals refer to like parts. Therefore, only the differences are described here. According to this embodiment, the inner opening 404 is provided off centre in respect to the conductive sheet 403. Furthermore, the antenna structure 402 comprises a number of additional openings 440. Such additional openings 440 may, e.g. provide an improved bonding if the tag is laminated between two layers, since the lamination material on each side of the tag may come into mutual contact through the openings 404, 440. The antenna structure 402 shown in this embodiment features an inner opening 404, which is located slightly off-centre on the conductive sheet 403. By shifting the inner opening 404 towards the outer end 407 of the slot 406, a length of an inner periphery of the antenna structure 402 is decreased. This decreases a capacitance of the antenna structure 402, resulting in an increased resonance frequency. In contrast, the addition of additional openings 440 near the periphery of the inner opening 404 in effect increases the periphery length, resulting in a decreased resonance frequency.

FIG. 5 shows different options for wireless communication devices 501, or RFID chips having four connection points 521. Typically such chips have two ground connection points and two antenna connection points, which may be connected to two independent antenna circuits. However, according to this invention, only one antenna circuit is provided. Commonly, the two pairs of connector points may be connected in parallel, as shown in FIG. 5a, viz. with the two ground connection points connected on one side of the slot 505, and with the two antenna connection points connected on the other side of the slot 505. However, if the chip 501 is rotated 90 degrees before mounting, both circuits are short circuited, resulting in a defunct RFID device. Thus, care must be taken to orientate the chip 501 correctly.

Alternatively, as shown in FIG. 5b, the chip 501 may be connected diagonally across the slot 505. In this way, all four possible rotational orientations are functional. However, the mechanical connection between the chip 501 and the conductive sheet 503 is halved, compared to e.g. FIG. 5a. Shown in FIG. 5c is a conductive sheet 503, adapted with two isolated pads 550. The chip has been omitted for clarity. According to this embodiment, two connection points of the chip are respectively connected to the two isolated pads 550, and the other two connection points are connected directly to the conductive sheet 503. In this way, the chip may be orientated in any of the four ways and still yield a functional RFID device. One drawback of this method is that the location of the isolated pads 550 as defined during production of the antenna structure dictates the location of the chip 501. Thus, tuning of the resonance frequency may not be achieved easily by changing the position of the chip on a generic antenna structure, thus requiring other methods of tuning to be deployed. Contrarily, the mounting scheme shown in FIG. 5d may be combined with tuning by varying the chip position. According to this embodiment, two holes 552 are made in the conductive sheet 503 and possibly through a carrying layer. These holes correspond to the positions of the two connection points which are not to be used. E.g. the holes may be made with a laser or with a mechanical tool. Thus, the holes may be made through out the manufacturing process until immediately preceding the mounting of the chip to the antenna structure.

FIG. 6 shows a marking tag 660 according to the invention. The marking tag 660 comprises an RFID device 600, corresponding to the embodiments described above, where like reference numerals refer to like parts. Additionally, the marking tag 660 comprises an attachment means 662. The attachment means 662 may take many different forms, depending on the application. Specifically, in case the marking tag 660 is to be used as an ear mark for an animal, the attachment means 662 may be a pin that is suitable for piercing the ear of the animal to be marked. In that case, the attachment means 662 must be sufficiently thick as to not cut a tear in the ear. The attachment means en comprises engagement means 664 for lockingly engaging locking means 666 of the marking tag 660. For example, the engagement means 664 may be barbs or flukes, which may bend parallel to the attachment means 662 for passage of the inner opening 604 of the marking tag 600, but which flanges out to engage in the locking means 888 to prevent removal of the marking tag 680. The marking tag may be made from a thermoplastic, such as acrylonitrile butadiene styrene (ABS). E.g. the marking tag may be made as a capsule, wherein the RFID device is inserted, before the capsule is closed for example by ultra sound welding. Alternatively, the tag may be made by fixating the RFID device to a polymer body, which is subsequently cast in an injection molding process. A suitable material choice for the latter method could be thermoplastic polyurethane.

According to an alternative embodiment of the marking tag 600, the RFID device 600 may be comprised in a male part of the tag 600, instead of in a female part, as shown in FIG. 6. In this alternative case, central hole through the RFID device is still advantageous to facilitate securing of the locking pin to a mounting tool.

The examples have been described according to preferred embodiments. However, the invention is not limited to these embodiments. For example, the conductive sheet of the antenna structure need not be circular, but may take other shapes, such as elliptical or polygonal. Likewise, the inner opening may also take other shapes, besides circular. Furthermore, the antenna structure may comprise any number of additional openings. Also, the RFD devices have been shown in the figures with the wireless communication device mounted on the antenna structure via a strap, however, the wireless communication device may also be directly mounted on the antenna, e.g. by soldering.

REFERENCE NUMERAL LIST 100, 200, 300, 400, 600 RFID device
101, 201, 301, 401, 501 wireless communication device
102, 202, 302, 402, 602 antenna structure
103, 203, 303, 403, 503, 603 conductive sheet
104, 204, 304, 404, 604 inner opening
105, 205, 305, 405, 505 slot
106, 206, 308, 406 inner end
107, 207, 307, 407 outer end
220, 320, 520 carrying layer
221, 521 contact point
440 additional openings
550 isolated pad
552 hole
660 marking tag
662 attachment means
664 engagement means
666 looking means

The invention claimed is:
1. A radio frequency identification RFID device (100, 200, 300, 400, 600) comprising:
the RFID device configured to be attached to an object and to be tuned at an assembly time to a material surrounding the device,
a wireless communication device (101, 201, 301, 401), such as an RFID chip or strap, having at least a pair of contact points (221, 521), and
an antenna structure (102, 202, 302, 402, 602) adapted to provide an omni-directional radiation pattern, having a sheet (103, 203, 303, 403, 503, 603) of electrically conductive material being provided with an inner opening (104, 204, 304, 404, 604) so as to provide a hole through the antenna structure (102, 202, 302, 402, 602), the inner opening being configured to facilitate a locking mechanism engaging with the tag through the opening, the sheet (103, 203, 303, 403, 503, 603) further being provided with an elongated slot (105, 205, 305, 405) with a first and a second side, the slot (105, 205, 305, 405) having an inner end (106, 206, 306, 406) at a periphery of the opening (104, 204, 304, 404, 604) and an outer end (107, 207, 307, 407) at a periphery of the sheet (103, 203, 303, 403, 503, 603), the slot (105, 205, 305, 405) being formed so as to provide a spacing between the first side and the second side, and where the conductive material is adapted to surround the inner opening in a radial direction from the first side of the inner end and to the second side of the inner end in an angular direction away from the slot, wherein
the conductive material is electrically connected from the first side of the slot (105, 205, 305, 405) to the second side of the slot (105, 205, 305, 405) via the contact points (221) and through the communication device (101, 201, 301, 401) at a position along the length of the slot between the inner end (106, 206, 306, 406) and the outer end (107, 207, 307, 407), the position along the length of the slot being determined so as to tune the RFID device to a pre-determined resonance frequency, allowing the device to be adapted to specific electronic parameters and tuned to different configurations depending on the materials directly surrounding the device.

2. RFID device (100, 200, 300, 400, 600) according to claim 1, wherein the antenna structure (102, 202, 302, 402, 602) is adapted for receiving and transmitting radio frequency waves having frequencies within the Ultra High Frequency UHF range, i.e. in the range 800 MHz-1100 MHz.

3. RFID device (100, 200, 300, 400, 600) according to claim 1, wherein the antenna structure (102, 202, 302, 402, 602) has an outer width in the range of 10-65 mm, 12-40 mm, 15-35 mm, or even 20-30 mm.

4. RFID device (100, 200, 300, 400, 600) according to claim 1, wherein the opening (104, 204, 304, 404, 604) has a diameter in the range of 5-30 mm, or 10-20 mm, or even 12-16 mm.

5. RFID device (100, 200, 300, 400, 600) according to claim 1, wherein the opening (104, 204, 304, 404, 604) has a circular shape.

6. RFID device (100, 200, 300, 400, 600) according to claim 1, wherein the conductive sheet (103, 203, 303, 403, 503, 603) of the antenna structure (102, 202, 302, 402, 602) has a thickness which is less than 10%, or less than 7%, or less than 5%, or even less than 1% of a maximum outer dimension or diameter of the conductive sheet (103, 203, 303, 403, 503, 603).

7. RFID device (100, 200, 300, 400, 600) according to claim 1, wherein the electrically conductive sheet (103, 203, 303, 403, 503, 603) of the antenna structure (102, 202, 302, 402, 602) comprises a substantially circular outer periphery.

8. RFID device (100, 200, 300, 400, 600) according to claim 7, wherein the opening (104, 204, 304, 404, 604) is substantially circular and has a diameter in the range of 30%-90%, or 40-80%, or even 50%-70% of a diameter of the conductive sheet (103, 203, 303, 403, 503, 603) of the antenna structure (102, 202, 302, 402, 602).

9. RFID device (100, 200, 300, 400, 600) according to claim 1, wherein the slot (105, 205, 305, 405) is substantially straight.

10. RFID device (100, 200, 300, 400, 600) according to claim 1, further comprising at least a first and a second protection layer, wherein the first and the second protection layers, respectively, are on a first and a second side of an assembly comprising the wireless communication device (101, 201, 301, 401) and the antenna structure (102, 202, 302, 402, 602), the first and second protection layers covering at least substantial parts of the assembly, wherein the first and second protection layers are in mutual contact through the opening (104, 204, 304, 404, 604) in the antenna structure (102, 202, 302, 402, 602), and are in mutual contact along at least part of an outer edge of the antenna structure (102, 202, 302, 402, 602).

11. Marking tag (660) for animals, such as an ear tag, comprising a radio frequency identification device according to claim 1, wherein the marking tag (660) further comprises an attachment member for piercing a part of the animal, such as an ear, the attachment member comprising engagement means (664), and wherein the opening (104, 204, 304, 404, 604) of the marking tag (660) comprises locking means (666), which locking means (666) are adapted for being lockingly engaged with the engagement means (664) of the attachment means (662).

12. Method for manufacturing of a radio frequency identification RFID device, comprising the steps of:
a) providing a wireless communication device with two contact points,
b) providing a carrying layer for an antenna structure and adapting the antenna to provide an omni-directional radiation pattern,
c) applying a conductive layer to the carrying layer in a basic geometry, the basic geometry having an elongated slot, the slot having an outer end at the periphery of the conductive layer,
d) providing a substantially central opening through the carrying layer and the conductive layer, wherein the opening is configured to facilitate a locking mechanism engaging with the tag through the opening, and wherein the opening and the slot are arranged such that the slot has an inner end at the periphery of the opening and adapting the conductive material to surround the inner opening in a radial direction from a first side of the inner end and to a second side of the inner end in an angular direction away from the slot,
e) tuning the resonance frequency of the device by changing a position of the wireless communication device along the slot of the antenna structure and allowing the device to be adapted to specific electronic parameters and tuned to different configurations depending on the materials directly surrounding the device, and
f) fixating the wireless communication device permanently to the antenna structure in the position found by tuning;
    the method further comprising attaching the RFID to an object and tuning at an assembly time to the material surrounding the device.

* * * * *